US007222058B2

(12) United States Patent
Miller

(10) Patent No.: US 7,222,058 B2
(45) Date of Patent: May 22, 2007

(54) METHOD OF MODELING AND SIZING A HEAT EXCHANGER

(75) Inventor: John P. Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 718 days.

(21) Appl. No.: 10/281,766

(22) Filed: Oct. 28, 2002

(65) Prior Publication Data

US 2004/0083012 A1    Apr. 29, 2004

(51) Int. Cl.
*G06F 17/10* (2006.01)

(52) U.S. Cl. ............... 703/2; 702/130; 702/136; 702/137; 702/183; 165/4; 165/186; 376/217; 376/210; 376/243; 376/247; 376/298; 376/299; 376/244; 376/211

(58) Field of Classification Search ............... 373/217; 203/1; 702/183, 13, 23; 73/118.1, 864.87; 165/148, 80.4, 104.11; 703/2
See application file for complete search history.

(56) References Cited

U.S. PATENT DOCUMENTS

| | | | | |
|---|---|---|---|---|
| 3,397,742 | A | 8/1968 | Jenssen et al. | 165/167 |
| 3,810,509 | A | 5/1974 | Kun | 165/148 |
| 4,127,165 | A | 11/1978 | Small | 165/162 |
| 4,136,736 | A | 1/1979 | Small | 165/162 |
| 4,206,738 | A | 6/1980 | Heeren et al. | 165/148 |
| 4,284,133 | A | 8/1981 | Gianni et al. | 165/133 |
| 4,828,021 | A | 5/1989 | Small | 165/162 |
| 4,828,022 | A | 5/1989 | Koehler et al. | 165/185 |
| 4,998,580 | A | 3/1991 | Guntly et al. | 165/133 |
| 5,406,969 | A | 4/1995 | Gray et al. | 137/13 |
| 6,061,412 | A | * 5/2000 | Stucker et al. | 376/217 |
| 6,173,761 | B1 | 1/2001 | Chandratilleke et al. | 165/104.21 |
| 6,282,497 | B1 | * 8/2001 | Bharathan et al. | 702/23 |
| 6,551,466 | B1 | * 4/2003 | Kresnyak et al. | 203/1 |
| 6,651,035 | B1 | * 11/2003 | Lang | 702/183 |
| 6,755,078 | B2 | * 6/2004 | Hernandez et al. | 73/118.1 |

(Continued)

OTHER PUBLICATIONS

Yunus A. Cengel□□Introduction to Thermodynamics and Heat Transfer, 1997□□Irwin McGraw-Hill, ISBN 0-07-011498-6.*
Adrian Bejan□□Heat Transfer, 1993□□John Wiley & Son, Inc., ISBN 0-471-50290-1.*
Frank P. Incropera, David P. DeWitt□□Introduction to Heat Transfer, 2002□□John Wiley & Son, Inc., ISBN 0-471-38649-9.*

*Primary Examiner*—Kamini Shah
*Assistant Examiner*—Cuong Van Luu
(74) *Attorney, Agent, or Firm*—Marshall, Gerstein & Borun LLP

(57) ABSTRACT

A method of modeling a heat exchanger is disclosed and comprises assigning input temperatures, assumed output temperatures, and a set of flow rates, inputting the parameters into a set of equations arranged to calculate a heat transfer coefficient, inputting parameters into a second set of equations arranged to calculate output temperatures, substituting actual output temperatures for the assumed output temperatures, and again calculating the heat transfer cooefficient. The new heat transfer coefficient is then used to obtain revised actual output temperatures, and the initial actual output temperatures and the revised actual output temperatures are compared to determine whether they differ by less than a desired variance. If not, a new iteration is performed until the output temperatures converge.

3 Claims, 6 Drawing Sheets

U.S. PATENT DOCUMENTS

| | | |
|---|---|---|
| 6,892,802 B2 * | 5/2005 | Kelly et al. ................. 165/148 |
| 6,920,395 B2 * | 7/2005 | Brown ........................ 702/13 |
| 6,941,825 B2 * | 9/2005 | Pawliszyn ............... 73/864.87 |
| 6,955,051 B2 * | 10/2005 | Marin et al. .................. 60/653 |
| 2003/0062149 A1 * | 4/2003 | Goodson et al. ....... 165/104.11 |
| 2005/0049838 A1 * | 3/2005 | Danko .......................... 703/2 |
| 2005/0056023 A1 * | 3/2005 | Pierson ........................ 60/772 |
| 2005/0205241 A1 * | 9/2005 | Goodson et al. ........... 165/80.4 |

* cited by examiner

Figure 1 – Excel Spreadsheet Calculating Temperature Drop

| Description | Var | Equation | Eq. # | Value | Unit |
|---|---|---|---|---|---|
| Entering Hot Water Temperature | $T_{h,i}$ | * A | | 160 | °F |
| Entering Cold Water Temperature | $T_{c,i}$ | * A | | 58 | °F |
| Flow Rate of Hot Water | $GPM_h$ | * A | | 2 | Gal/Min |
| Flow Rate of Cold Water | $GPM_c$ | * A | | 2.5 | Gal/Min |
| Capacity of Hot Water | $C_h$ | $C_h = GPM_h * 500$ | 8 | 1000 | Btu/h/°F |
| Capacity of Cold Water | $C_c$ | $C_c = GPM_c * 500$ | 9 | 1250 | Btu/h/°F |
| Minimum Capacity | $C_{min}$ | $C_{min} = min(C_h, C_c)$ | 10 | 1000 | Btu/h/°F |
| Maximum Capacity | $C_{max}$ | $C_{max} = max(C_h, C_c)$ | 11 | 1250 | Btu/h/°F |
| Capacity Ratio | $C_r$ | $C_r = C_{min}/C_{max}$ | 12 | 0.800 | |
| Total Heat Transfer Area | A | * B | | 1.19 | ft^2 |
| Average Heat Transfer Coefficient | U | * C | | 960 | Btu/h/(ft^2 °F) |
| Number of Transfer Units | NTU | NTU = U*A/Cmin | 15 | 1.142 | |
| Effectiveness of Heat Exchanger | $\varepsilon$ | $\varepsilon = \dfrac{1-\exp[-NTU(1-C_r)]}{1-C_r \exp[-NTU(1-C_r)]}$ | 14 | 0.562 | |
| Ideal Heat Transfer | $Q_{max}$ | $Q_{max} = C_{min} * (T_{h,i}-T_{c,i})$ | 7 | 102000 | Btu/h |
| Actual Heat Transfer | Q | $Q = \varepsilon * Q_{max}$ | 6 | 57331 | Btu/h |
| Leaving Hot Water Temperature | $T_{h,o}$ | $T_{h,o} = T_{h,i} - Q/C_h$ | 25 | 102.67 | °F |
| Leaving Cold Water Temperature | $T_{c,o}$ | $T_{c,o} = T_{c,i} + Q/C_c$ | 26 | 103.86 | °F |
| Hot Water Temperature Drop | $\Delta T_h$ | $\Delta T_h = T_{h,i} - T_{h,o}$ | | 57.33 | °F |

* A – User input
* B – From product literature
* C – Copied from Figure 2

Table  Spreadsheet used to Calculate Overall Heat Transfer Coefficient (U)

Fig. 2

| Description | Var. | Equation | Eq. # | Value | Unit |
|---|---|---|---|---|---|
| Tube Side Heat Transfer (Cold Water) | | | | | |
| Entering water Temperature | $T_{c,i}$ | * A | | 58 | °F |
| Estimate of exiting water temperature | $T_{c,o}$ | * B | | 103.90 | °F |
| Average water temperature | $T_{c,avg}$ | $T_{c,avg} = \dfrac{T_{c,i} + T_{c,o}}{2}$ | | 80.95 | °F |
| Flow rate of water (GPM) | $GPM_c$ | * A | | 2.5 | Gal/Min |
| Flow rate in ft^3/hr | $\dot{Q}_C$ | $\dot{Q}_C = GPM_c * 60 / 7.48$ | | 20.053 | ft^3/hr |
| Total cross-sectional area of tube side | $A_{tube}$ | * C | | 0.001237 | ft^2 |
| Inside diameter of tubes | $D_{in}$ | * C | | 0.006166 | ft |
| Average velocity of Cold Water | $V_{c,avg}$ | $V_{c,avg} = \dfrac{\dot{Q}_C}{A_{tube}}$ | | 16211 | ft/hr |
| Prandtl's number | Pr | * D | | 5.580 | |
| Kinematic Viscosity | $v_{water}$ | * D | | 0.03185 | ft^2/hr |
| Reynold's number | $Re_D$ | $Re_D = \dfrac{V_{c,avg} \cdot D_{in}}{v_{water}}$ | 22 | 3138.9 | |
| Friction factor | f | $f = \dfrac{1}{(1.82 \log Re_D - 1.64)^2}$ | 21 | 0.04481 | |
| Nusselt's number | $Nu_{D(tube)}$ | $Nu_{D(tube)} = \dfrac{(f/8) \cdot Re_D \cdot Pr}{1.07 + 12.7\sqrt{f/8}(Pr^{2/3} - 1)}$ | 20 | 31.546 | |
| Heat conduction coefficient for water | $k_{water}$ | * D | | 0.3541 | Btu/hr ft °F |
| Average heat transfer coefficient for tube side | $\bar{h}_{tube}$ | $\bar{h}_{tube} = \dfrac{k_{water}}{D_{in}} \cdot Nu_{D(tube)}$ | 18 | 1811.6 | Btu/hr ft^2 °F |
| | | | | | |
| Shell Side Heat Transfer (Hot Water) | | | | | |
| Entering water Temperature | $T_{h,i}$ | * A | | 160 | °F |
| Estimate of exiting water temperature | $T_{h,o}$ | * B | | 102.7 | °F |
| Average water temperature | $T_{h,avg}$ | $T_{h,avg} = \dfrac{T_{h,i} + T_{h,o}}{2}$ | | 131.35 | °F |
| Flow rate of water (GPM) | $GPM_h$ | * A | | 2 | Gal/Min |
| Flow rate in ft^3/hr | $\dot{Q}_h$ | $\dot{Q}_h = GPM_h * 60 / 7.48$ | | 16.043 | ft^3/hr |
| Total cross-sectional area of shell side | $A_{shell}$ | * C | | 0.002652 | ft^2 |
| Outside diameter of tubes | $D_{out}$ | * C | | 0.007833 | ft |

Fig. 2-continued

| Average velocity of Hot Water | $V_{h,avg}$ | $V_{h,avg} = \dfrac{\dot{Q}_h}{A_{shell}}$ | | 6049 | ft/hr |
|---|---|---|---|---|---|
| Prandtl's number | Pr | * D | | 3.235 | |
| Kinematic Viscosity | $v_{water}$ | * D | | 0.01965 | ft^2/hr |
| Reynold's number | $Re_D$ | $Re_D = \dfrac{V_{h,avg} \cdot D_{out}}{v_{water}}$ | 24 | 2411.2 | |
| Nusselt's number | $Nu_{D(shell)}$ | $Nu_{D(shell)} = 0.3 + \dfrac{0.62 \cdot Re_D^{1/2} Pr^{1/3}}{[1+(0.4/Pr)^{2/3}]^{1/4}}$ | 23 | 42.884 | |
| Heat conduction coefficient for water | $k_{water}$ | * D | | 0.3731 | Btu/hr ft °F |
| Average heat transfer coefficient for shell side | $\bar{h}_{shell}$ | $\bar{h}_{shell} = \dfrac{k_{water}}{D_{out}} \cdot Nu_{D(shell)}$ | 19 | 2042.4 | Btu/hr ft^2 °F |
| | | | | | |
| Total Heat Transfer Coefficient | U | $U = \dfrac{1}{\dfrac{1}{h_{tube}} + \dfrac{1}{h_{shell}}}$ | 17 | 960.0424 | Btu/hr ft^2 °F |

* A – Copied from First Spreadsheet

* B – Estimate of exiting temperatures are also copied from first spreadsheet, but must be consistent with the criteria $GPM_c*(T_{c,o}-T_{c,i}) = GPM_h*(T_{h,i}-T_{h,o})$

* C – Taken from product literature

* D – Taken from Thermodynamic property tables. In order to automate this step, a best-fit regression is used in this spreadsheet.

$Pr = 785 * T_{avg}{}^{\wedge}-1.1258$ $v = 2.5475 * T_{avg}{}^{\wedge}-0.9973$ $k = 0.2205 * T_{avg}{}^{\wedge}0.1078$

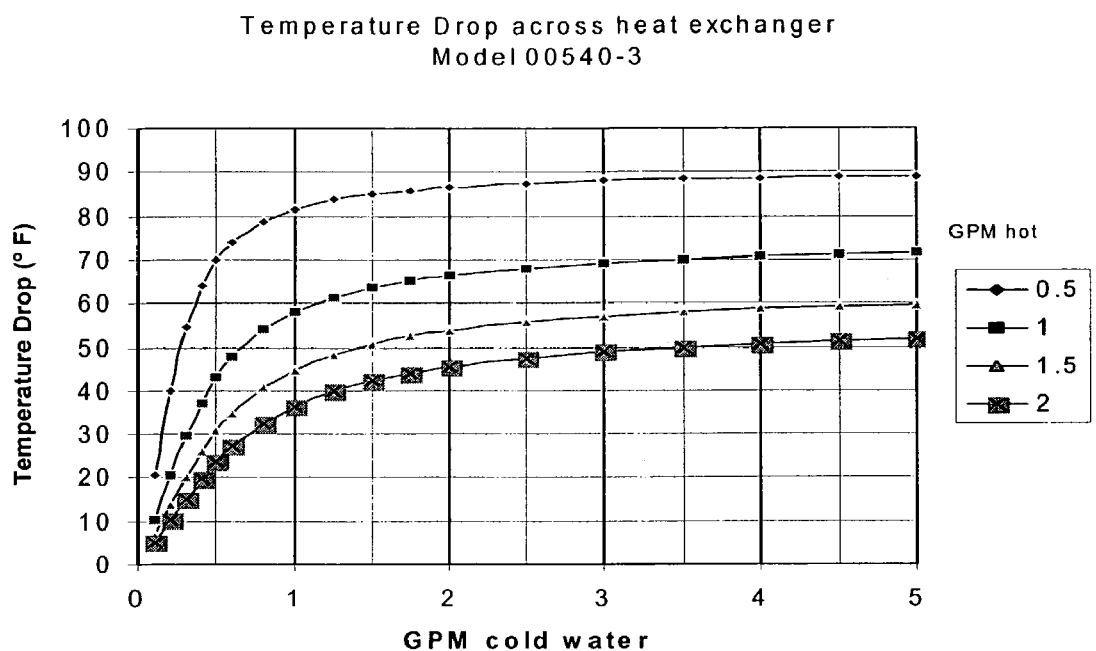
Fig. 4 - Heat Exchanger Chosen for Application
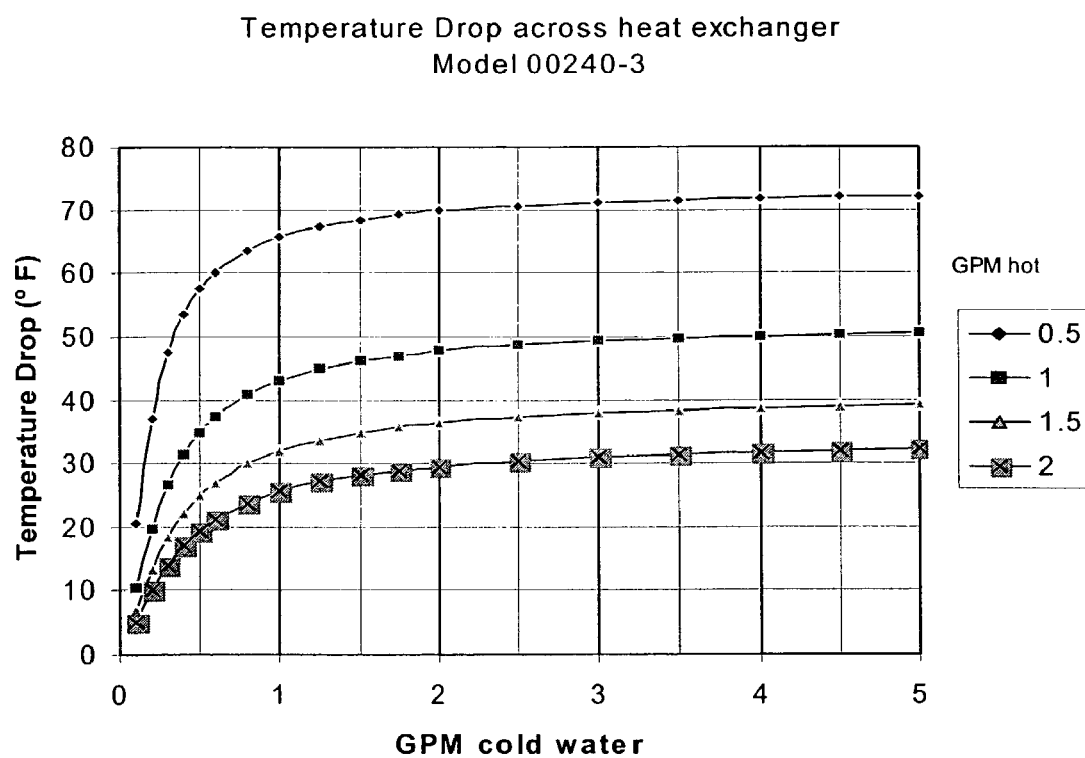
Fig. 5 - Heat Exchanger that is too Small

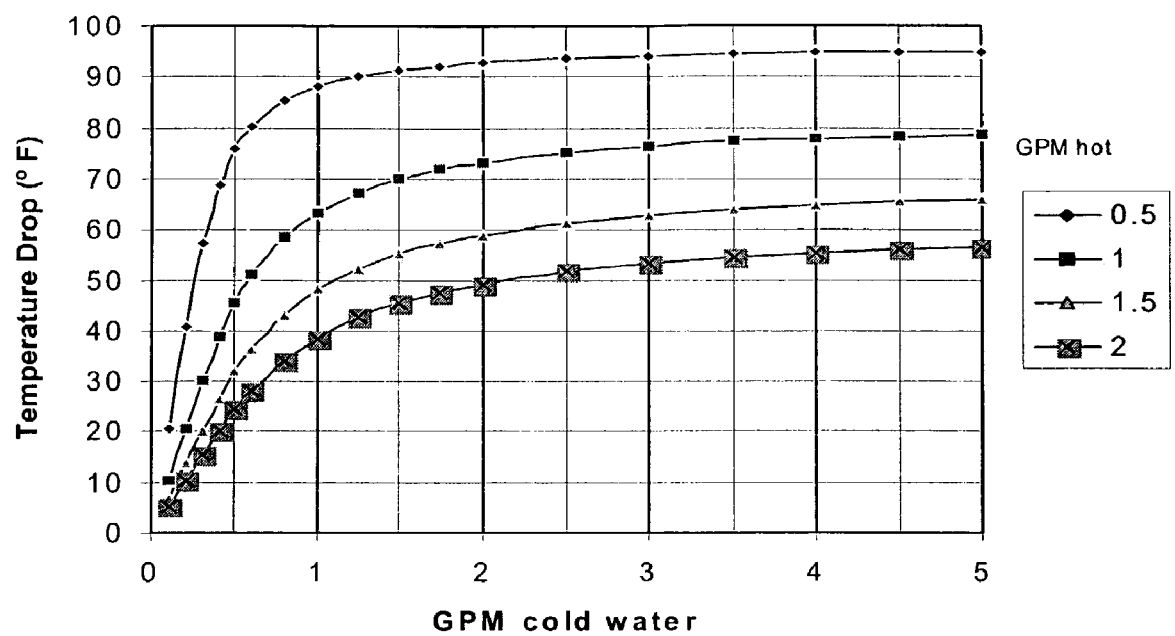
Fig. 6 - Heat Exchanger that is too Large

METHOD OF MODELING AND SIZING A HEAT EXCHANGER

FIELD OF THE INVENTION

The present invention relates generally to heat exchangers and, more particularly, to a method of modeling a heat exchanger such that the user can select an appropriately sized heat exchanger for the desired application.

BACKGROUND OF THE INVENTION

In heat exchanger operations, hot and cold water will pass through opposite sides of the heat exchanger. In many applications, it may be desirable to adjust the flow rate of the hot water and/or the flow rate of the cold water in order to obtain a desired temperature drop in the hot water. The hot water cycles through a continuous loop as the hot water removes heat from an industrial process (which, in a laboratory setting, may be simulated using an electrical or other suitable hot water heater). The hot water is then cooled by the heat exchanger. The cold water is supplied from a suitable cold water source.

In designing a temperature to flow cascade control loop, it may often be desirable to select a heat exchanger which allows sufficient heat transfer to obtain a desired drop in temperature on the hot water side. Yet, for design purposes, it is known that the actual heat transfer rate must be less than, and perhaps significantly less than, the maximum possible heat transfer rate for a given heat exchanger. By sizing a heat exchanger such that the actual heat transfer is less than the total available heat transfer, the control system can be used to make slight changes in output temperature by making slight changes to control valves/flow rates. Also, for a given temperature drop, the water flow rates need to be high enough that an automatic control valve can be adjusted with enough precision to get the correct output temperature. For example, in some applications it may be very difficult to achieve precise control over the temperature drop as the actual flow rates get lower.

Many commercial heat exchangers are available in a variety of sizes. However, it is often difficult to choose the most appropriate heat exchanger for a given application.

BRIEF DESCRIPTION OF THE DRAWINGS

FIG. 1 is a Table of values and variables used to calculate the hot water temperature drop across a representative heat exchanger and including certain design/size parameters taken from the representative heat exchanger;

FIG. 2 is a Table of values and variables used to calculate the overall heat transfer coefficient U for the heat exchanger and including certain design/size parameters taken from the representative heat exchanger;

FIG. 4 is a graph of the temperature drop across the representative heat exchanger;

FIG. 5 is a graph of the temperature drop across a second representative heat exchanger and indicating an insufficient temperature drop at certain flow rates; and FIG. 6 is a graph of the temperature drop across a third representative heat exchanger and indicating an excess capacity.

DETAILED DESCRIPTION OF THE DISCLOSED EXAMPLE

Figure 3:
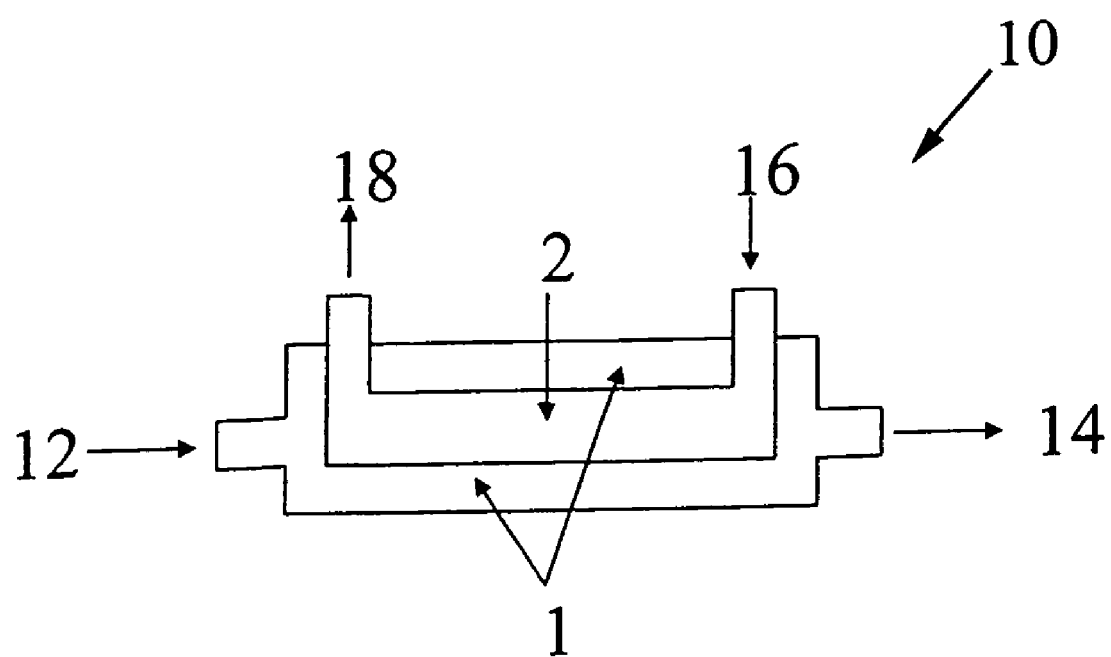
FIG. 3 is a schematic view of a heat exchanger.

The embodiment described herein is not intended to be exhaustive or to limit the scope of the invention to the precise form or forms disclosed. Instead, the following embodiment has been described in order to best explain the principles of the invention and to enable others skilled in the art to follow its teachings.

Referring now to FIG. 3 of the drawings, a heat exchanger is shown schematically therein and is generally referred to by the reference numeral 10. The heat exchanger 10 includes a hot side 1 and a cold side 2. The hot side 1 includes a hot water input 12 and a hot water output 14, while the cold water side 2 includes a cold water input 16 and a cold water output 18. It will be understood that during the operation of the heat exchanger, the water or other process medium flowing through the hot side 1 will experience a temperature drop, while the water or other process medium flowing through the cold side 2 will experience a temperature gain.

In order to gain a more complete understanding of an exemplary method 20 of modeling the performance of the heat exchanger outlined herein, it is first desirable to understand a number of preliminary calculations.

Preliminary Calculations

According to the exemplary method 20, first some basic assumptions may be made, which are then useful when applying a simple energy balance equation. The law of conservation of energy states that the energy transfer on both sides of the heat exchanger 10 must be equal, or:

$$\dot{m}_1 \cdot \Delta h_1 = \dot{m}_2 \cdot \Delta h_2 \qquad (1)$$

$\dot{m}_1$ and $\dot{m}_2$ are the mass flow rates of the two fluids through the heat exchanger.

$\Delta h_1$ and $\Delta h_2$ are the enthalpy drops of the two fluids across the heat exchanger.

The above-given equation and selected ones of the following equations are numbered for convenient reference. These reference numbers may be used to correlate the equations used in the spreadsheet calculations outlined below.

If desired, the mass flow rates may be converted to volumetric flow rates in a manner that would be known to those of skill in the art. Enthalpy drop may be shown in terms of specific heat and temperatures, also in a manner that would be known to those of skill in the art. When density and specific heat are the same for both sides, the above equation may be reduced to the next equation shown below. In the disclosed example, the heat exchanger 10 will use water on both sides (i.e., the hot side and the cold side). In the example discussed in detail herein, we can assume that the density and specific heat of water are constant for the range of temperatures between 40° F. and 200° F. Note that this assumption is for the particular case when water is used on both sides, with temperatures within a certain range. Generally, this is not always true. In the specific example discussed in detail herein, this assumption is appropriate. However, those of skill in the art will appreciate that different assumptions may have to be made when working with fluids other than water and when working outside the assumed temperature range noted above.

After making the foregoing assumptions, the energy balance equation reduces to $$GPM_1 \cdot \Delta T_1 = GPM_2 \cdot \Delta T_2 \qquad (2),$$

where GPM is the flow rate in gallons per minute on each side of the heat exchanger, and $\Delta T$ is the temperature drop on each side of the heat exchanger.

As an example, in the case of a specific heat exchanger having a temperature drop of 60° F. and having a flow rate of 5 gallons per minute, the energy transfer can be calculated using the following:

$$(5 GPM)(60°\text{ F.})(500 Btu/h/GPM/°\text{ F.}) = 150000 Btu/h = 44 kW \quad (3)$$

Thus, if an electric water heater were used in the loop in a laboratory setting in order to simulate a specific situation, the water heater would require about 44 kilowatts (kW) of electricity. This energy requirement may be larger than is conveniently satisfied in a laboratory setting. Thus, for the disclosed example, an electric water heater having an energy requirement of 12 kW was chosen as the largest practical example for the following calculations. To accommodate this lesser power requirement, one may lower both the temperature drop and the flow rate. Thus, for the disclosed example, it was decided that a temperature drop of 40° F. with a flow rate of 2 GPM would be satisfactory to require only 12 kW of heating power.

Heat Exchanger Background

When the heat transfer capability of the heat exchanger 10 is being evaluated, it is desirable to know both the inlet and the outlet temperatures on both the hot side 1 and the cold side 2, not just the temperature drop on the hot side 1 and the temperature gain on the cold side 2. Therefore, the energy balance equation may be re-written:

$$GPM_h \cdot (T_{h,i} - T_{h,o}) = GPM_c \cdot (T_{c,o} - T_{c,i}) \quad (4)$$

Where $T_{h,i}$=temperature of the hot water entering the heat exchanger $T_{h,o}$=temperature of the hot water leaving the heat exchanger $T_{c,i}$=temperature of the cold water entering the heat exchanger $T_{c,o}$=temperature of the cold water leaving the heat exchanger We can assume that the temperature of the hot water coming in is 160° F. This is an arbitrary number chosen because it is significantly lower than the boiling point of water, yet it is also significantly higher than room temperature. Chilled water from the cooling system of many buildings is commonly available at about 58° F., which becomes, in the disclosed example, the temperature of the cold water entering the heat exchanger. Thus, substituting the assumed temperatures, the energy balance equation becomes:

$$2 \cdot (160 - 120) = GPM_c(T_{c,o} - 58) \quad (5)$$

This equation can be used to determine an initial estimate for $T_{c,o}$, which is inserted into the second spreadsheet.

These assumed temperatures can then be used to develop the exemplary model 20 for describing the heat transfer of a specific heat exchanger, and to determine which heat exchanger model best meets the design parameters outlined by a user.

One method for determining the amount of heat transfer in a heat exchanger is the ε-NTU effectiveness method. In this method, the maximum possible heat transfer is calculated based upon the temperatures and the flow rates. This is the energy transfer that would occur if the heat exchanger had an infinite length. The effectiveness depends both upon the physical dimensions of the heat exchanger and the properties of the fluid moving through the heat exchanger. The variables from one equation depend upon results from other equations, and vice-versa. However, by integrating all of these equations into, for example, a MICROSOFT® EXCEL® spreadsheet, and by using macros to do the necessary iterations, it is possible to determine the amount of heat transfer produced by a given model of heat exchanger.

Heat Exchanger Equation

The amount of heat transfer in a heat exchanger is $$Q = Q_{max} * \varepsilon. \quad (6)$$

The maximum heat transfer possible is $$Q_{max} = C_{min} * (T_{h,i} - T_{c,i}) \quad (7)$$

$C_{min}$ is the heat transfer ability of the fluid with the smaller flow rate:

In order to calculate $C_{min}$, one must calculate the heat transfer ability of both fluids. $C_{min}$ will be the minimum of the two values, and $C_{max}$ will be the maximum of the two values. For the hot water side, $$C_h = GPM_h * 500 \quad (8)$$

For the cold water side, $$C_c = GPM_c * 500 \quad (9)$$

The minimum of these two values is $$C_{min} = \min(C_h, C_c) \quad (10)$$

The maximum of these two values is $$C_{max} = \max(C_h, C_c) \quad (11)$$

The capacity ratio is the minimum capacity divided by the maximum capacity:

$$C_r = C_{min}/C_{max} \quad (12)$$

Note that this example is specific only for water, when it is assumed that the density of water is a constant 62.3 lb/ft^3 and the specific heat of water is a constant 1 Btu/lb/° F. This is satisfactory for our purposes, but if different fluids, or more extreme temperatures are used, then a more general form of the equation is needed.

The more general equation for this is $$C_1 = \dot{m}_1 c_{p1} \text{ and } C_2 = \dot{m}_2 c_{p2} \quad (13)$$

where $m_1$ and $m_2$ are the mass flow rates of the two fluids, and $c_{p1}$ and $c_{p2}$ are the specific heats of the two fluids. This reduces to the specific form described above for the case of water at normal temperatures.

The effectiveness, ε is a function of the capacity ratio $C_r$ and the number of transfer units NTU, both of which are defined in heat transfer textbooks. For a concentric tube heat exchanger in counter-flow, the effectiveness is $$\varepsilon = \frac{1 - \exp[-NTU(1 - C_r)]}{1 - C_r \exp[-NTU(1 - C_r)]} \text{ (Sparrow, 149)} \quad (14)$$

Other geometries of heat exchangers have other equations for effectiveness, which can be found in heat transfer textbooks, or product literature.

$$\text{Number of Transfer Units} = NTU = U*A/C_{min}. \quad (15),$$

where

A=total surface transfer area of the heat exchanger; and

U=overall average heat transfer coefficient.

Therefore, the variables that are needed to determine the total heat transfer in a heat exchanger are:

$GPM_{min}$—Minimum Flow Rate $GPM_{max}$—Maximum Flow Rate $T_{h,i}$—Incoming Hot Water Temperature $T_{c,i}$—Incoming Cold Water Temperature A—Total Surface Transfer Area for the Chosen Heat Exchanger U—Overall Average Heat Transfer Coefficient $GPM_{min}$, $GPM_{max}$, $T_{h,i}$, and $T_{c,i}$ are variables that, in accordance with the disclosed example, are specified by the user. The value for A is found in product literature for any given heat exchanger, for example, and in accordance with the disclosed example, the heat exchanger being modeled. The only variable that is very difficult to determine is the overall heat transfer coefficient U.

Overall Heat Transfer Coefficient U

Referring now to FIG. 2, in order to determine U according to the disclosed example, it is desirable to know the average heat transfer coefficients on both sides of the heat exchanger. These equations may be found in heat transfer textbooks. The average heat transfer on each side of the heat exchanger 10 is a function of the diameter of the inside tube (d), the conduction coefficient (k), and Nusselt's number (Nu). Nusselt's number is a function of the Reynolds Number (Re) and Prandtl's number (Pr). The Reynolds number Re depends upon the diameter of the tubes, the velocity of the fluid, and the kinematic viscosity of the fluid. Prandtl's number depends upon the temperature of the liquid or other process medium. Although it may seem difficult to evaluate all these equations simultaneously, the method 20 according to the disclosed example provides a solution by ensuring that the number of equations is the same as the number of unknowns.

The following equations may be evaluated to determine U:

$$\frac{1}{AU} = \frac{1}{Ah_{tube}} + \frac{1}{Ah_{shell}} \tag{16}$$

$Ah_{tube}$, and $Ah_{shell}$ represent the thermal resistances of the of the water on the tube and shell side of the heat exchanger. The total thermal resistance is AU. Note that the method for determining total thermal resistance is the same as adding electrical resistances in parallel.

This equation reduces to $$U = \frac{1}{\frac{1}{h_{tube}} + \frac{1}{h_{shell}}} \tag{17}$$

where,
heat transfer on the tube side is:

$$\bar{h}_{tube} = \frac{k_{water}}{D_{in}} \cdot Nu_{D(tube)} \tag{18}$$

heat transfer on the shell side is:

$$\bar{h}_{shell} = \frac{k_{water}}{D_{out}} \cdot Nu_{D(shell)} \tag{19}$$

$k_{water}$ is the heat conduction constant for water, determined from tables, for a certain temperature.

$D_{in}$ is the inside diameter of the tubes in the heat exchanger.

$D_{out}$ is the outside diameter of the tubes of the heat exchanger.

Nusselt's number for tube side:

$$Nu_{D(tube)} = \frac{(f/8) \cdot Re_D \cdot Pr}{1.07 + 12.7\sqrt{f/8}\,(Pr^{2/3} - 1)} \tag{20}$$

Friction factor:

$$f = \frac{1}{(1.82 \log Re_D - 1.64)^2} \tag{21}$$

Reference Sparrow at 90.

Pr is Prandtl's number, which is found in tables for a certain temperature of water.

Reynolds number:

$$Re_D = \frac{V_{avg} \cdot D_{in}}{v_{water}} \tag{22}$$

$V_{avg}$ is the average velocity of water moving through the tubes. This can be determined by taking the volumetric flow rate of water on the tube side (gallons per minute converted to cubic feet per hour), divided by the total cross-sectional area of all the tubes.

$v_{water}$ is the kinematic viscosity of the water at the specified temperature.

Sparrow, at 70.

Nusselt's Number for the shell side:

$$Nu_{D(shell)} = 0.3 + \frac{0.62 \cdot Re_D^{1/2} Pr^{1/3}}{[1 + (0.4/Pr)^{2/3}]^{1/4}} \tag{23}$$

Sparrow at 69.

Pr is Prandtl's number, which is found in tables for a certain temperature of water.

$$\text{Reynolds number } Re_D = \frac{V_{avg} \cdot D_{out}}{v_{water}} \tag{24}$$

$V_{avg}$ is the average velocity of water flowing across the shell side. (The flow rate divided by the cross-sectional area).

$V_{water}$ is the kinematic viscosity of the water at the specified temperature.

When one combines all of these equations, it is possible to determine the average heat transfer coefficient U, and thus it is possible to determine the total performance of the heat exchanger.

After the value of U is found, it is now possible to determine the total heat transfer Q. When the total heat transfer is known, the outlet temperatures of the hot and cold water can be determined.

$$T_{h,o} = T_{h,i} - Q/C_h \tag{25}$$

$$T_{c,o} = T_{c,i} + Q/C_c \tag{26}$$

According to the disclosed example, and referring now to FIG. 1, the above equations are embodied in a MICROSOFT® EXCEL® spreadsheet in order to conveniently implement these equations. The result is that one can input the temperatures of the hot and cold water entering the heat exchanger, as well as the flow rates of hot and cold water. The algorithm calculates the amount of heat transfer, and the exiting temperatures of both the hot and cold water. If one performs this calculation for many different values of the cold water flow rate, using a constant flow rate of hot water, , then a graph of cold water flow rate versus temperature drop can be obtained. Multiple hot water flow rates can also be used to create multiple plots on the graph. This graph can be used to determine if a particular heat exchanger is able to perform correctly for the desired purposes.

The value for Total Heat Transfer Area (Atube) changes depending upon the type of Heat Exchanger selected. The value for Average Heat Transfer Coefficient (U) changes depending upon both the type of heat exchanger selected, and the flow rate of the hot and cold water. (A higher flow rate gives more turbulence in the current, and so gives a greater rate of heat transfer.)

A separate spreadsheet is used to calculate the value of U (FIG. 2).

To find the temperature drop for a certain flow rate, one must copy the input temperatures, flow rates, and initial estimates for output temperatures from the first spreadsheet to the second spreadsheet. These numbers will be used to calculate the value for the overall heat transfer coefficient U. The value for U is then copied back to the first spreadsheet and used to determine the actual temperature drop $(T_{h,i}-T_{h,o}=\Delta T)$. Then, a check is performed to see if the assumed exiting temperatures in the second spreadsheet are near the actual exiting temperatures calculated using the first spreadsheet. If these temperatures are not close, (e.g., not within a specified variance) then one must copy the values from the first spreadsheet back to the second spreadsheet, and run the calculations again. One should iterate this process until the difference between the two spreadsheets is less than the required tolerance. In the disclosed example, a tolerance of 0.1° F. was chosen.

Graphs

FIG. 4 is a plot of hot water and cold water flow rates versus the temperature drop of the hot water. Notice, for this particular heat exchanger model (a model 00540-3, manufactured by Exergy Incorporated of Hanson, Mass.), the slope of the curve at the point where the curve for 2 GPM of hot water intersects the line for a 40° F. temperature drop. The slope of the curve corresponds to the gain of the system. By examining the graph at this point, it is clear that the controller will be able to adjust the temperature drop to slightly above or below 40° by making correspondingly small changes to the cold water flow rate. This may be desirable in order for the control system to be able to maintain a steady temperature drop across the heat exchanger.

This particular model of heat exchanger is satisfactory for the example given herein. In fact, this is the model that was chosen for the actual cascade control loop.

According to the disclosed method, the above-described process is repeated for a plurality of hot water and cold water flow rate valves. The outputs for all of the selected flow rate valves may then be graphed as is shown in FIG. 4.

However, for comparison one can look at the graph for a heat exchanger that has a much smaller surface area (FIG. 5). Notice that for this graph, the curve corresponding to 2 GPM of hot water, can never reach the 40° F. temperature drop. One would have to use only 1 GPM of hot water to be able to reach a 40° F. temperature drop for hot water. Clearly, this heat exchanger does not have enough performance for this application.

One can also see what the graph looks like for a heat exchanger that is too large (FIG. 6). In this case, one can get much more heat transfer than is really necessary. This is better than not getting enough heat transfer. But the main disadvantage is that for this model, the cold water flow rate needs to be extremely low, which could be difficult to measure and control accurately. Also, a larger than necessary heat exchanger costs a lot more, and so there is money wasted by using a heat exchanger that is too large.

CONCLUSION

Using the disclosed method, one may model and then determine the size of heat exchanger necessary for a chosen application. Two concepts are utilized in the exemplary method. The first concept is taking established heat transfer equations and combining them into one complete mathematical model using MICROSOFT® EXCEL®, and an iterative method of numerical solution. The second concept is selecting a heat exchanger based upon the curve generated by the method, for given flow rates of hot and cold fluids. This mathematical model can be used for many applications in which one must select a heat exchanger that is large enough to get the necessary heat transfer, but not so large that money is wasted.

Numerous modifications and alternative embodiments of the invention will be apparent to those skilled in the art in view of the foregoing descriptions. Accordingly, these descriptions are to be construed as illustrative only and are for the purpose of teaching those skilled in the art the best mode or modes presently contemplated for carrying out the invention. The details of the structure or structures disclosed herein may be varied substantially without departing from the spirit of the invention, and the exclusive use of all modifications which come within the scope of the appended claims, either literally or under the doctrine of equivalents, is reserved.

REFERENCES

Sparrow, Ephraim M. *Convection Heat Transfer Notes.* University of Minnesota. 2000.

What is claimed:

1. A method of determining a size of a heat exchanger for a chosen application using a computer spreadsheet, the method comprising:
    a) identifying a heat exchanger;
    b) acquiring a plurality of heat exchanger parameters for the heat exchanger;
    c) assigning input temperatures, the input temperatures comprising a hot water input temperature and a cold water input temperature;
    d) assigning a first set of flow rates, the first set of flow rates comprising a first hot water flow rate and a first cold water flow rate;
    e) inputting the first set of flow rates, the input temperatures, and a set of assumed output temperatures into a set of equations arranged in a computer spreadsheet to obtain a heat transfer coefficient, the set of assumed output temperatures comprising a hot water output temperature and a cold water output temperature, and calculating a first heat transfer coefficient with the computer spreadsheet;
    f) inputting the heat exchanger parameters, the first set of flow rates, the first heat transfer coefficient, and the input temperatures into a set of equations arranged to calculate a set of output temperatures in the computer spreadsheet, the output temperatures comprising a first hot water output temperature and a first cold water output temperature, and calculating the set of output temperatures with the computer spreadsheet;

g) inputting the set of output temperatures into the set of equations arranged to calculate the heat transfer coefficient, and calculating a second heat transfer coefficient;

h) inputting the second heat transfer coefficient value into the set of equations arranged to calculate the set of output temperatures, and calculating a revised set of output temperatures with the computer spreadsheet; and i) calculating a first variance between the set of output temperatures and the revised set of output temperatures with the computer spreadsheet;

j) assigning the revised set of output temperatures as the set of output temperatures;

k) repeating steps g) through j) until the variance is less than 0.1 degree F., and l) outputting the revised set of output temperatures to an output device, wherein a temperature range for the water is between 40° F. and 200°F., a specific heat for the water is constant; and a density for the water is constant.

2. The method of claim 1, wherein the output device is a printer.

3. The method of claim 1, wherein the output device is a computer screen.

* * * * *

UNITED STATES PATENT AND TRADEMARK OFFICE
CERTIFICATE OF CORRECTION

| | |
|---|---|
| PATENT NO. | : 7,222,058 B2 |
| APPLICATION NO. | : 10/281766 |
| DATED | : May 22, 2007 |
| INVENTOR(S) | : John P. Miller |

Page 1 of 1

It is certified that error appears in the above-identified patent and that said Letters Patent is hereby corrected as shown below:

At Column 7, line 9, "water, ," should be -- water, --.

At Column 7, line 61, "valves" should be -- values --.

At Column 7, line 62, "valves" should be -- values --.

Signed and Sealed this

Twenty-third Day of December, 2008

JON W. DUDAS
*Director of the United States Patent and Trademark Office*